United States Patent [19]
Howeth

[11] Patent Number: 4,681,609
[45] Date of Patent: Jul. 21, 1987

[54] TOP LOADING AND INVERTED BACKFLUSHED AIR FILTER SYSTEMS

[76] Inventor: D. Franklin Howeth, 233 Chuck Wagon Trail, Fort Worth, Tex. 76108

[21] Appl. No.: 657,712

[22] Filed: Oct. 9, 1984

Related U.S. Application Data

[63] Continuation-in-part of Ser. No. 549,924, Nov. 7, 1983, abandoned.

[51] Int. Cl.⁴ .................. B01D 46/04; B01D 29/38
[52] U.S. Cl. ...................................... 55/302; 55/311; 55/432; 55/438; 55/459 R; 55/480; 55/502
[58] Field of Search ................ 55/302, 310, 311, 313, 55/432, 438, 459 R, 480, 493, 502, 504; 210/304, 308, 309

[56] References Cited

U.S. PATENT DOCUMENTS

| | | | |
|---|---|---|---|
| 1,127,242 | 2/1915 | Hay | 55/302 X |
| 1,471,807 | 10/1923 | Roosevelt et al. | 210/304 |
| 2,308,365 | 1/1943 | Hornbrook | 55/432 X |
| 3,219,394 | 11/1965 | Moss et al. | 302/59 |
| 3,307,335 | 3/1967 | Shomaker | 55/432 X |
| 3,377,783 | 4/1968 | Young | 55/432 X |
| 3,765,152 | 10/1973 | Pausch | 55/302 X |
| 3,868,238 | 2/1975 | Mills, Jr. et al. | 55/302 X |
| 4,043,775 | 8/1977 | Solomon | 55/302 |
| 4,204,846 | 5/1980 | Brenholt | 55/304 X |
| 4,217,122 | 8/1980 | Shuler | 55/480 |
| 4,227,893 | 10/1980 | Shaddock | 55/432 X |
| 4,284,422 | 8/1981 | Ferland | 55/432 X |
| 4,323,376 | 4/1982 | Rosenquest | 55/493 X |
| 4,336,040 | 6/1982 | Haberl | 55/432 X |
| 4,357,151 | 11/1982 | Helfritch et al. | 55/302 X |
| 4,388,087 | 6/1983 | Tipton | 55/302 X |
| 4,445,914 | 5/1984 | Richard | 55/432 X |

Primary Examiner—Robert Spitzer
Attorney, Agent, or Firm—Hubbard, Thurman, Turner & Tucker

[57] ABSTRACT

Single and multiple porous media impingement type air filter elements are disposed in filter housings which provide access to the filter elements from top opening doors or plenums in the housing for service or repair of the elements. Housing sections defining the plenums are provided with mechanism to lift and swing the housing sections clear of the filter opening, and the housing sections are movable to relieve excess working pressure differentials across the filter element. In two embodiments the filter elements are each in sealing engagement with a shield which is also sealingly engaged with a top wall or door of the filter housing to minimize contamination of personnel servicing or replacing the filter elements. Clean air is discharged through a downwardly extending clean air flow tube into a discharge plenum or chamber and particulate material separated from the air flow stream falls into a material collecting hopper portion which may be defined in part by a sloping wall separating the clean air flow chamber from the particulate material collection chamber. Filter element backflushing air control valves may be located in the bottom of the filter housing to enhance the accessibility of the filter elements from the top of the housing and to minimize overall height of the filter apparatus.

32 Claims, 12 Drawing Figures

TOP LOADING AND INVERTED BACKFLUSHED AIR FILTER SYSTEMS

CROSS REFERENCE TO RELATED APPLICATION

This application is a continuation in part of U.S. patent application Ser. No. 549,924 filed: Nov. 7, 1983, now abandoned.

BACKGROUND OF THE INVENTION

1. Field of the Invention

This invention pertains to single and multiple arrangements of porous media barrier or impingement type air filter units which are removable from a top wall of the filter cabinet and are provided with improved reverse or backflushing air filter cleaning systems to provide for operation of the filter system at air flow rates greater than the derated systems heretofore required.

2. Background

In the art of porous media impingement type air filters and dust collectors the development of so called reverse jet or backflushing type filter cleaning systems has complicated the arrangement of air filter units and their support cabinetry or housings. The reverse jet nozzles and valving as well as the manifolding therefor must be removed or set aside to gain access to the filter element or the filter element must be removed from the bottom of its support housing. Both situations are disadvantageous in that the removal of the backflushing structure is difficult and complicates the support equipment for this mechanism. Access to the filter element through the side or bottom of a filter housing is particularly disadvantageous in that it requires entry into the so called "dirty" side of the interior of the filter housing.

Another problem associated with the conventional arrangements of pleated paper or similar types of porous media filter elements with respect to reverse jet type filter cleaning systems pertains to the fact that the reverse jet air flow develops a pressure pulse having a gradient which tends to propel particulate material off and away from the filter element in such a way that the material having the greatest distance to fall into a collection chamber is not propelled away from the filter element sufficiently to prevent it from being entrained in the air flow stream through the filter element and recollecting almost immediately on the element itself. This practice as well as other problems with prior art filters has necessitated the substantial derating of filter elements used with reverse jet air cleaning or flushing systems.

Yet another problem associated with prior art type air filters pertains to certain applications of material separation processes wherein the particulate material being separated from the process air has a relatively high moisture content. In conventional filter construction this moisture content tends to cause the separated material to collect on the wall of the lower portion of the filter housing and in freezing conditions results in a substantial buildup of material within the filter housing which cannot be dislodged except by entry into the interior of the housing and thereby requiring shutdown of the filter system. Moreover, water vapor condensation often occurs in the reverse flushing air control circuit and in conventional arrangements can freeze in the control valves and conduits thereby causing the reverse jet flushing air system to malfunction.

Accordingly, there have been several problems in the art of porous media impingement or barrier type filter units which are utilized in a wide variety of applications, which problems have not been overcome with known types of filter structures. The conventional way of constructing the filter cabinet, the reverse jet flushing air system, and providing access to the filter elements has continued to present problems in non uniform loading of the filter elements, non uniform and inefficient cleaning of the elements, poor access to the elements for replacement or repair and poor control over the discharge of separated material. These and other disadvantages of prior art filter systems have been overcome with the air filter systems of the present invention.

SUMMARY OF THE INVENTION

The present invention provides an improved air filter apparatus of the type including a so called barrier or porous media type air filter element which is subject to accumulation of particulate material collected from an air flow stream flowing through the filter element and wherein periodically the accumulations of material are blown off the filter element by a reverse flow of relatively low pressure air through the filter element.

In particular the present invention provides an apparatus wherein the filter element is arranged in a filter housing for removal from the top side of the housing without requiring access to the so called "dirty side" of the housing through the primary material separation chamber. In two embodiments of the invention a filter housing is provided with a unique mechanical lifting mechanism for removing a top section of the housing at will and a pressure relief mechanism for momentarily moving the upper housing section due to excessive pressure buildup across the filter element.

In accordance with an important aspect of the invention the filter housing may be constructed in such a way that the air being processed by the filter element, and which is at a temperature normally greater than the ambient temperature of the environment flows out of the filter housing through a chamber formed in part by a wall surface which normally receives particulate material which has been separated in the filtering process and in such a way that the wall is warmed by the air being filtered to prevent the accumulation of moisture laden or frozen material on the wall surface.

In accordance with another aspect of the present invention an air filter apparatus is provided which includes a so-called inverted arrangement of a reverse jet backflushing air system for removing particulate material which has accumulated on the surface of a porous media type filter element. The improved arrangement of the reverse jet back flushing air system provides a filter backflushing air pressure gradient which tends to propel material away from the filter element in such a way that the material which has the greatest distance to fall clear of the filter element is also removed or propelled away from the filter element a greater distance. The arrangement of the reverse jet back flushing system provides a more efficient and uniform cleaning operation than prior art systems.

In accordance with another aspect of the present invention the filter apparatus is constructed in such a way that entry of material laden air into a multiple compartment housing is distributed to flow more evenly around and through one or more filter elements in the housing. Moreover, the arrangement of the reverse air jet valving and associated control circuitry within a lower portion of the filter housing results in a more compact housing construction, places the reverse jet air circuitry in an area which is warmed by the process air flowing through the filter unit and remains accessible for servicing and repair without requiring removal or disassembly during servicing or inspection of the filter elements themselves.

Those skilled in the art will recognize the above described features and advantages of the present invention as well as additional superior aspects thereof upon reading the detailed description which follows in conjuntion with the drawing.

DESCRIPTION OF THE PREFERRED EMBODIMENTS

Figure 1:
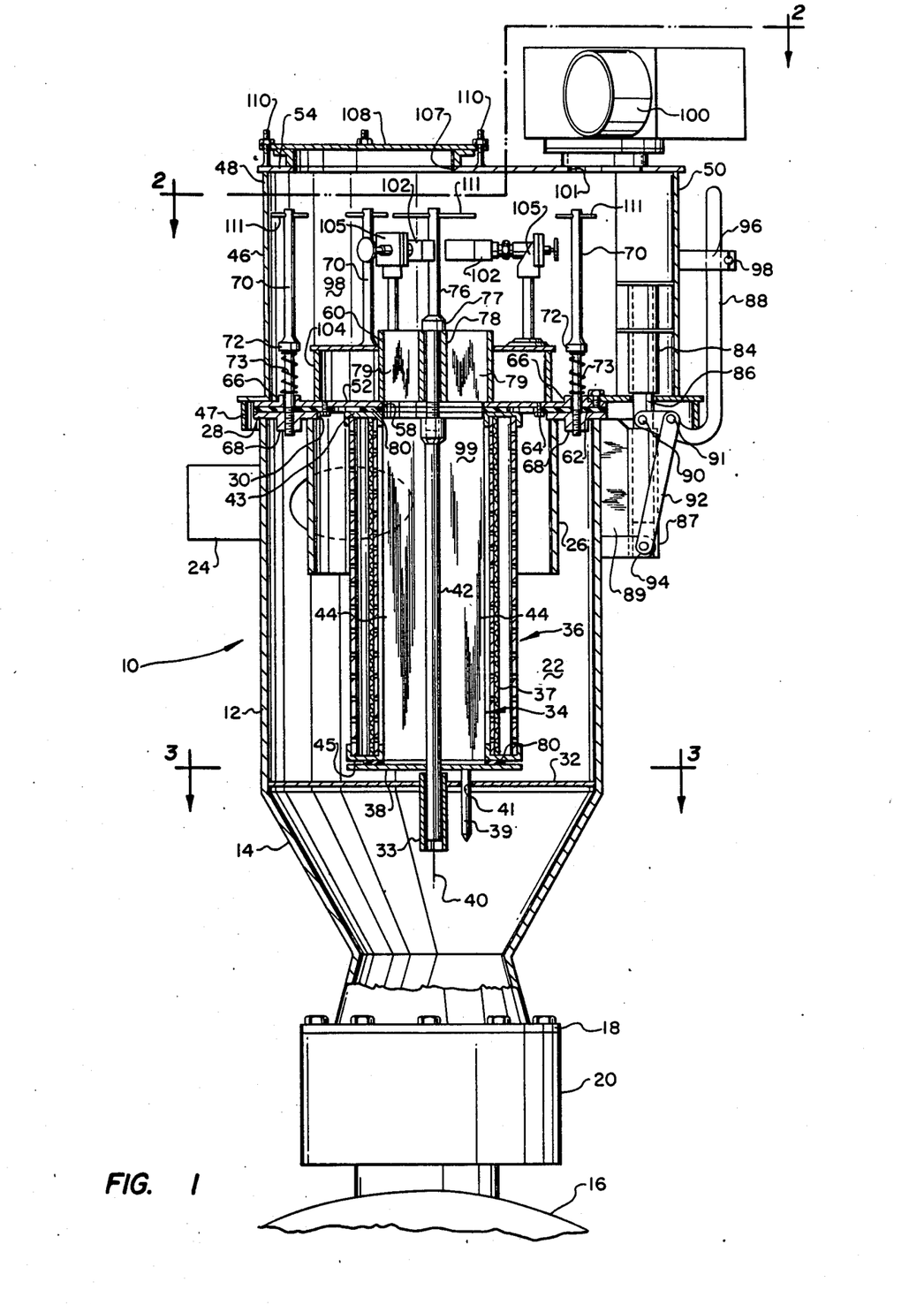
FIG. 1 is a longitudinal section view of one embodiment of an air filter unit taken generally along the line 1—1 of FIG. 2.
Figure 2:
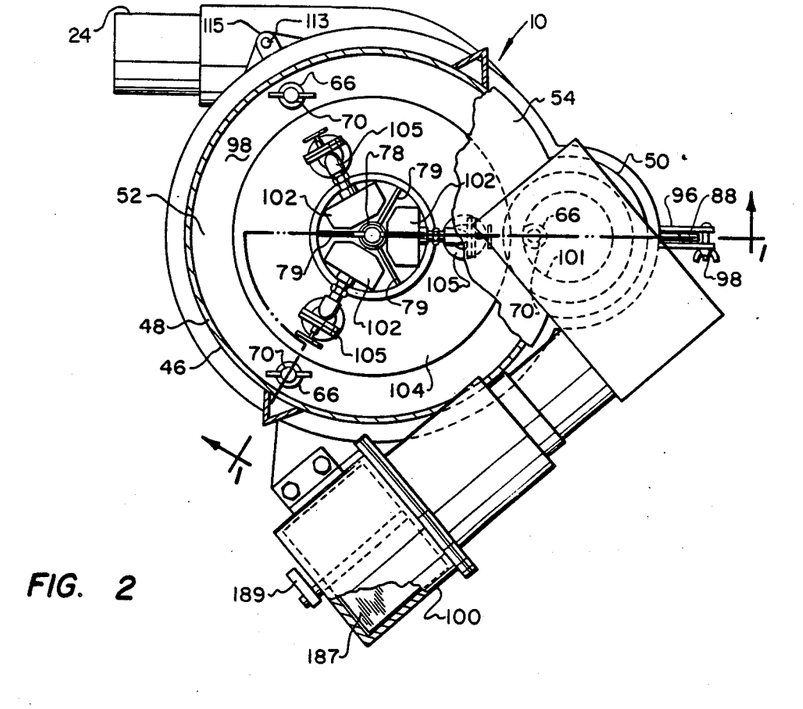
FIG. 2 is a plan view, partially sectioned, of the filter unit illustrated in FIG. 1.

Referring to FIGS. 1 and 2, there is illustrated one embodiment of an improved air filter unit generally designated by the numeral 10. The filter unit 10 includes a generally cylindrical lower housing section 12 having a conical hopper portion 14 supporting the housing 12 on the top of a tank 16 for receiving flowable bulk material such as dry cement, flour and similar commodities. The tank 16 may receive dust or other particulate matter separated from an air flow stream flowing through the filter unit 10. The hopper portion 14 preferably includes a flange 18 for securing the filter unit 10 to a rotary air lock type valve 20 which may be opened continuously or periodically to discharge material into the tank 16 which has been separated from air flowing through the filter unit 10.

The housing section 12 forms an interior chamber 22 which is in communication with an inlet conduit 24 for conducting dust laden air into the chamber 22 from a source, not shown. The conduit 24 opens into the interior chamber 22 substantially tangentially with respect to the circumference of the housing section 12 whereby dust laden air flow entering the chamber 22 is forced to undergo a change in direction by swirling in a cyclonic or vortiginous manner around a cylindrical shroud or baffle 26 arranged concentrically within the housing section 12. The baffle 26 is supported by an upper transverse endwall 28 having a central, generally circular opening 30 formed therein.

Figure 3:
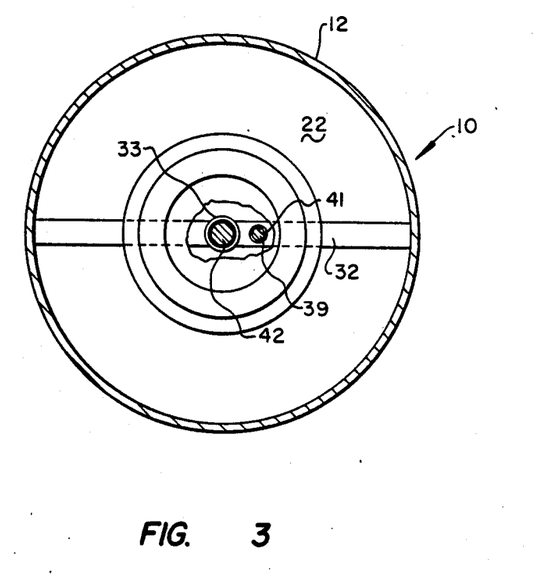
FIG. 3 is section view taken along the line 3—3 of FIG. 1.

Referring to FIG. 3 also, a support bracket 32 extends across the interior of the housing section 12 and is provided with a sleeve 33 for supporting a guide and support member 34 for a cylindrical tubular filter element 36. The guide member 34 includes a bottom plate portion 38 extending transversely with respect to a longitudinal central axis 40 of the filter unit 10. An axially extending locating pin 39 extends through a cooperating hole 41 in the bracket 32. The guide member 34 also includes a central tubular column member 42 extending into the sleeve 33 and from which extend radially a plurality of partition plates 44. The filter element 36 is of a known type generally characterized by an annular pleated paperlike porous media barrier member 37 supported between opposed top and bottom transverse walls 43 and 45.

Referring to FIGS. 1 and 2, the filter unit 10 is also provided with a cylindrical upper housing section 46 including a first cylindrical wall portion 48 and a second cylindrical wall portion 50 defining part of a clean air discharge duct. The housing section 46 includes a transverse bottom wall 52 and a top wall 54. The bottom wall 52 is delimited by an opening 58 coaxial with a longitudinal extending clean air flow tube 60. The bottom wall 52 is adapted to support a resilient annular gasket member 62 secured to the bottom wall by suitable fasteners 64. A substantially fluid-tight seal is formed between the housing section walls 28 and 52 as illustrated in FIG. 1. The housing section 46 is yieldably secured to the housing section 12 with the respective walls 28 and 52 directly adjacent each other and separated only by the gasket 62. In this regard, as indicated in FIGS. 1 and 2, the bottom wall 52 is provided with three circumferentially spaced bosses 66 which are adapted to be aligned with cooperating bosses 68 formed on the endwall 28, two shown in FIG. 1. The bosses 68 are each suitably threaded to receive the threaded end of respective elongated rod members 70 each having a transverse shoulder 72 for retaining a coil spring 73 between the shoulder 72 and the boss 66 cooperating with the respective rod member.

The filter element 36 is secured to the bottom wall 52 of the upper housing section 46 by an elongated screw threaded member 76 which extends through a guide tube 78 and engages the tube at a head portion 77. The guide tube 78 is supported in the flow tube 60 by radially extending partition plates 79, FIG. 2, preferably aligned with the partition plates 44, respectively. The screw member 76 is adapted to be threadedly engaged with a cooperating upper threaded end portion of the column member 42. Accordingly, the filter element 36 may be biased into fluid-tight engagement with the bottom wall 52 and with the support plate 38. Suitable annular gaskets or seals 80 may be interposed between the respective endwalls 43 and 45 of the filter element 36 and the adjacent wall 52 and plate 38, as indicated in FIG. 1.

Figures 4, 5, 6:
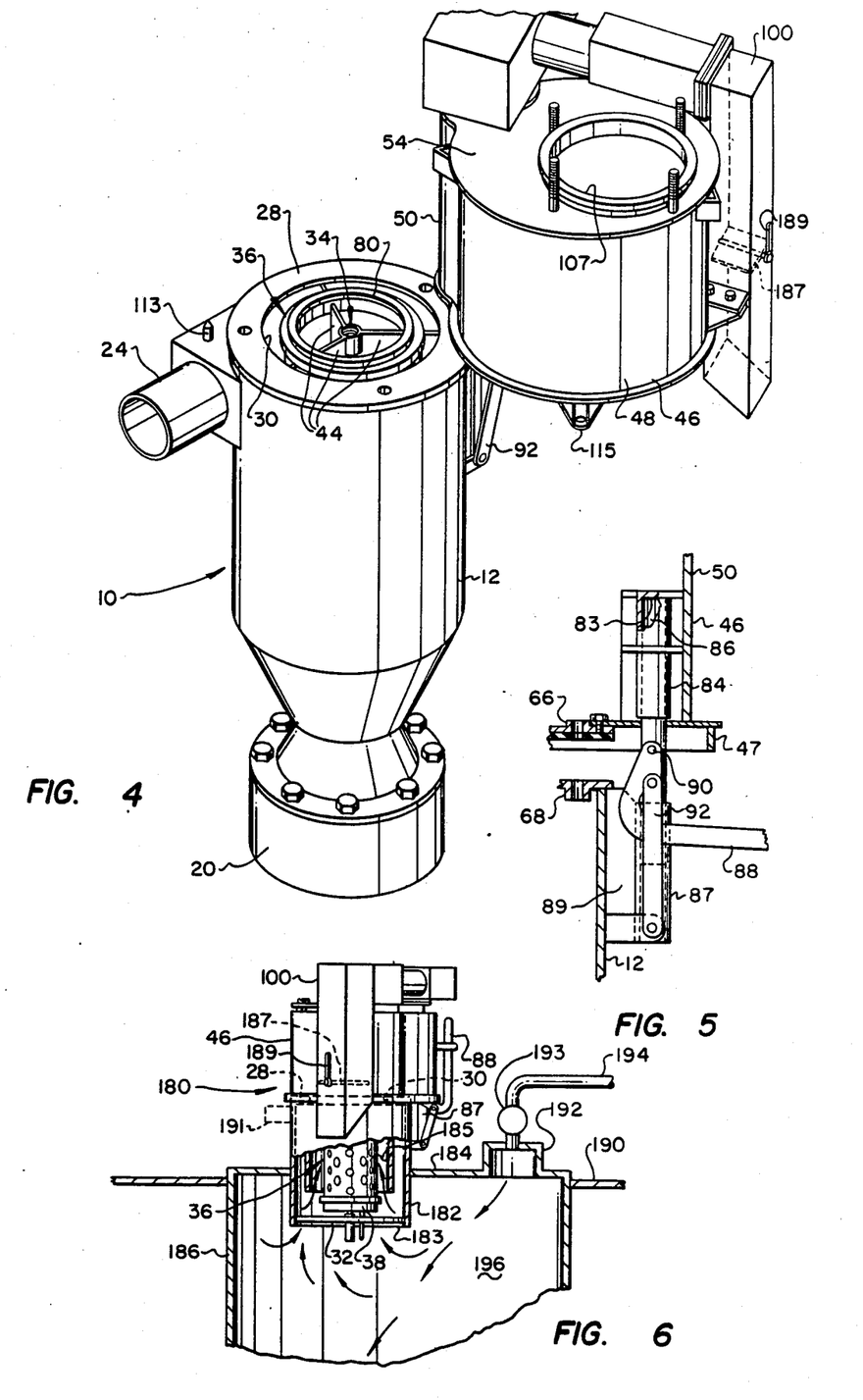
FIG. 4 is a perspective view showing the top housing section of the filter unit swung away from the bottom housing section to permit access to the filter element.
FIG. 5 is a detail section view showing the housing actuating mechanism in the position wherein the top housing section has been elevated.
FIG. 6 is a detail elevation view, in section, of a modified filter unit in accordance with the present invention mounted on top of a shipboard bulk material storage tank.

The housing section 46 is adapted to be moved vertically upward away from the housing section 12 and then swung laterally with respect to the axis 40 away from the opening 30 so that the filter element 36 may be removed from the interior chamber 22. Referring to FIGS. 1 and 5, the housing section 46 is provided with a cylindrical sleeve bearing member 84 which is disposed in axially slidable and rotatable sleeved relationship over a vertically extending hinge pin 86. The hinge pin 86 is supported on the housing section 12 for vertical axial movement in a bearing tube 87 secured to the housing section 12 by a web 89. The housing section 46 may be lifted vertically with respect to the housing section 12 for pivotal movement about the longitudinal central axis of the hinge pin 86 by linkage means comprising a handle 88 pivotally secured to the hinge pin 86 at 90 and pivotally connected at 91 to one end of a link 92. The link 92 is pivotally secured at its opposite end to a bracket 94 fixed to the exterior of the housing section 12. As shown in FIG. 1, the handle 88 may be disposed in a stowed position and secured by a clevis 96 on the housing section 46 and having a removable retaining pin 97 extending therethrough. In response to pivotal movement of the handle 88 about pivot 90 in a clockwise direction, viewing FIGS. 1 and 5, the housing section 46 may be lifted vertically by axial extension of the hinge pin 86 in engagement with bearing tube endwall 83 from the position shown in FIG. 1 to the position shown in FIG. 5. The rods 70 and the screw member 76 are, of course, first disconnected from the endwall 38 and the guide member 34, respectively. The housing section 46 may then by swung about the axis of the hinge pin 86, as shown in FIG. 4, for access to the filter element 36.

Referring to FIGS. 1 and 2, the housing section 46 defines an interior chamber 98 through which clean air flows from an interior clean air chamber 99 of filter element 36 to an outlet conduit or duct 100 through an opening 101 in top wall 54. The interior chamber 98 is also adapted to accommodate a reverse flow filter element cleaning system including a plurality of reverse flow air jet manifolds 102 which are supported above an annular supply air manifold 104 and disposed directly above the flow tube 60. The manifolds 102 are in communication with the supply manifold 104 by way of respective flow control valves 105 whereby periodic discharge of reverse flow air jets from the manifold 102 toward the flow tube 60 may be obtained to flush the filter element 36. Further description of the reverse jet cleaning air system is not believed to be necessary for practicing the present invention; however, reference may be made to U.S. patent application Ser. No. 549,963 filed Nov. 7, 1983, now U.S. Pat. No. 4,544,389. Access to the interior chamber 98 may be obtained through an opening 107 closed by a removable cover 108 secured to the top wall 54 by suitable retaining members 110. Accordingly, when it is desired to gain access to the interior chamber 98 for disconnecting the rod members 70 and the retaining screw member 76, the cover 108 may be removed whereupon the members 76 and 70 are easily accessible for release from securing the filter element 36 to the housing section 46 and securing the housing sections 46 and 12 in engagement with each other. The members 70 and 76 are each preferably provided with a so-called T handle portion 111 to facilitate hand tightening and release of the respective members. Upon removal of the members 70 and 76, the handle 88 may be rotated to elevate the housing section 46 to the position shown in FIG. 5, followed by rotation of the housing section 46 about the axis of the hinge pin 86 to the position indicated in FIG. 4 whereby the filter element 36 may be easily removed from the guide member 34 and replaced.

A particularly significant advantage of the arrangement of the filter unit 10 provides for removing the filter element 36 from the so-called clean side of the filter unit. This is due to the fact that filtration of dust laden air occurs as the air flows from the chamber 22 into the interior chamber 99 and into the chamber 98 for final discharge through the conduit 100. Accordingly, personnel servicing the filter unit are not required to gain access to the filter element 36 through the chamber 22. The filter element 36 may, of course, be inspected and replaced if necessary by a similar filter element, not shown, which may be inserted through the opening 30 in sleeved relationship over the guide member 34. The guide member 34 itself may be removed from the housing section 12 in assembly with the filter element 36 and this may be carried out preferably using the screw member 76 by threading the screw member loosely into the threaded socket formed in the top end of the guide member 34. When the guide member 34 is reinserted into its working position shown in FIG. 1, the locating pin 39 provides for alignment of the partition plates 44 with the plates 79 withing the tube 60. The housing sections 12 and 46 are aligned with each other by a locating pin 113, FIG. 4, and a cooperating pin bore formed in a bracket 115.

Another important aspect of the filter unit 10 pertains to the ability of the housing section 46 to yieldably move away from the housing section 12 if a pressure differential between the chamber 98 and the chamber 22 exceeds a predetermined amount as determined by the biasing force of the coil springs 73. If the filter element 36 should become clogged with dust thereby increasing the pressure drop across the filter element, a fluid pressure force acting on the axially projected area of the bottom wall 52 and the filter element 36 delimited by the opening 30 will produce a resultant force tending to lift the housing section 46 vertically upward in opposition to the bias of the coil springs 73. Accordingly, depending on the compression of the coil springs 73 and their spring rate a predetermined pressure at which the housing section 46 is forced to separate from the housing section 12 may be selected. Although some dust laden air will escape from the filter unit 10 between the housing sections 12 and 46, in the event that a predetermined pressure in the chamber 22 is reached, this separation of the housing sections will serve as a warning that a clogged or damaged filter element condition exists whereby the system feeding dust laden air to the filter unit 10 may be shut down for subsequent inspection and/or servicing of the filter unit. The housing section 46 is preferably provided with a peripheral flow deflecting skirt 46 for directing any air released in a generally downward direction along the housing section 12 and to also prevent water ingestion into the interior of the filter unit.

Figures 7, 7A:
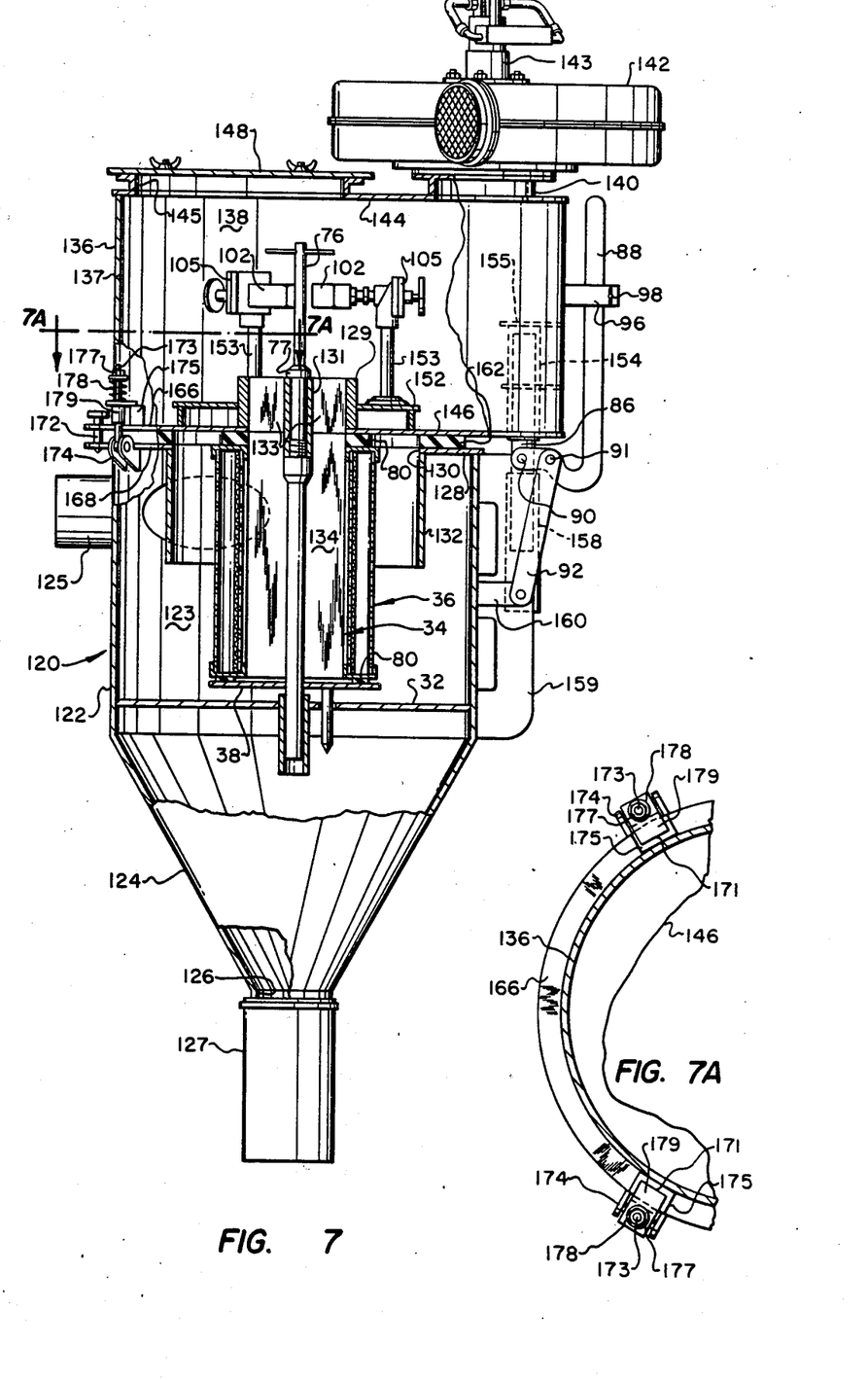
FIG. 7 is a longitudinal vertical section view of an alternate embodiment of the present invention adapted for use with so-called negative or subatmospheric pressure filtration systems.
FIG. 7A is a detail section view taken along line 7A—7A of FIG. 7.

Referring now to FIG. 7, there is illustrated an alternate embodiment of a filter unit in accordance with the present invention which is particularly adapted for so-called negative pressure filtration systems, such as are utilized in many applications including bulk material pneumatic conveying, and various dust control systems. The filter unit illustrated in FIGS. 7 and 7A is generally designated by the numeral 120 and includes a lower filter housing section 122 having a downwardly extending conical shaped material collection and discharge portion 124. The conical housing section 124 includes a bottom dump opening 126 to which a check valve or other suitable closure 127 is connected and may be adapted to discharge material in response to an equalization of pressure between the ambient pressure and the air pressure inside the interior chamber 123 of housing section 122. The housing section 122 includes a transverse top wall 128 having a central opening 130 in which is disposed a filter element 36 supported on a guide member 34. The guide member 34 is suitably retained on a transverse bracket 32. Air laden with entrained dust is introduced into the interior chamber 123 of housing section 122 tangentially through an inlet conduit 125 and avoids direct impingement on the filter element 36 thanks to a downwardly depending cylindrical tubular baffle 132 secured to the top wall 128. Heavier dust particles settle or separate from the air flowing into the interior chamber 123 due to gravitational and centrifugal forces and collect at the bottom of the conical housing portion 124 for discharge through valve 127. Air flows through the filter element 36 and into an interior chamber 134 formed within the filter element and upward through a flow tube 129 disposed in an upper generally cylindrical housing section 136.

The upper housing section 136 includes a cylindrical sidewall 137 and forms an interior chamber 138 for receiving clean air flow from the chamber 134 and for discharging clean air through an outlet conduit 140 by way of a vacuum pump or suction fan 142 having a drive motor 143. The housing section 136 also includes top and bottom walls 144 and 146. An access port 145 is formed in the top wall 144 and is closed by a removable cover 148. The flow tube 129 includes a central guide tube or boss 131 supported by partition plates 133 in a manner similar to the filter unit 10. A screw member 76 extends through the guide tube 131 and secures the filter element 36 between the wall 146 and the plate 38, including suitable gaskets 80. A reverse jet filter cleaning air supply manifold 152 is disposed around the flow tube 129 and is supportive of a plurality of conduits 153 which are adapted to support reverse flow cleaning jet manifolds 102 and control valves 105 similar to the arrangement described in conjunction with FIGS. 1 through 4. The housing section 136 is also supported on the housing section 122 in a manner similar to the arrangement of the filter unit 10. The housing section 136 is provided with a bearing sleeve 154 having an upper transverse endwall 155 and adapted for receiving a vertically extendable hinge pin 86 which is axially slidably supported in a bearing tube 158 supported on a web 159 secured to the housing section 122. A lifting handle 88 is pivotally connected to the hinge pin 86 at pivot 90 and is also connected to link 92. The link 92 is pivotally supported at its opposite end on a bracket 160 secured to the housing section 122. The handle 88 is retained by a clevis and retaining pin arrangement 96-98, similar to the arrangement of the filter unit 10 when the handle is not in use to lift the housing section 136 away from the top of the housing section 122. Alternatively, the hinge pin 86 could be lifted by other means such as by providing cooperating power screw form threads on the pin 86 and the tube 158.

Filtered air is prevented from escaping between the bottom wall 146 of the housing section 136 and the top wall 128 by an annular seal ring 162. The housing section 136 is aligned with housing section 122 by a pin 172 extending from a flange 166 through a cooperating bore in a flange 168. Referring also to FIG. 7A, the housing section 136 is yieldably secured to the housing section 122 by a plurality of radially spaced apart connector members, one shown in FIG. 7 and two shown in FIG. 7A, comprising T-shaped tiedown pins 173 pivotally secured to the outer wall of the lower housing section 122 by clevis type brackets 174 and adapted to be swung into position in engagement with cooperating brackets 175 suitably secured to the outside wall of the housing section 136. The tiedown pins 173 each include a distal threaded portion having a retaining nut 177 disposed thereon and retaining a coil spring 178 around the pin and between the nut 177 and a latch member 179 slidably supported on the pin 173 in sleeved relationship thereover. Each latch member 179 includes a laterally projecting part 171 which is operable to be engageable with a bracket 175 on flange 166 for yieldably biasing the housing section 136 into engagement with the housing section 122.

In the event that a predetermined pressure differential across the filter element 32 provides a pressure force acting on the axially projecting area delimited by the opening 130, the housing section 136 will move upward relative to the housing section 122 moving the latch members 179 against the bias of the coil springs 178 to relieve the pressure difference between the chambers 123 and 138. Moreover, the spring biased latch members 179 equalize the forces acting on the seal member 162 to prevent leakage between the housing sections 122 and 136.

Upon removal of the cover member 148 and removal of the retaining screw 76, the pins 173 may be swung outward and downwardly clear of the brackets 175 so that the housing section 136 may be jacked vertically upward by rotation of the lever 88 to elevate the housing section 136. The housing section 136 may then be swung about the axis of the hinge pin 86 into a position to provide access to the filter element 36 for removal of the element from the interior chamber 123.

Referring now to FIG. 6, there is illustrated a modified filter unit 180 similar to the filter unit 10. The filter unit 180 includes essentially all of the structure of the filter unit 10 with the exception that the lower housing section 12 is modified to form a housing section 182 which is adapted to be mounted on a horizontal top wall 184 of a bulk material storage tank 186. The housing section 182 includes a transverse top wall 28 with a central opening 30 for removal of the filter element 36 from an interior chamber 185. The storage tank 186 is disposed substantially below a horizontal deck 190 with the exception of the top wall 184 and a bulk material inlet fitting 192 suitably connected to a conduit 194 whereby fluidized or pneumatically conveyed bulk material may be discharged into an interior chamber 196 of the tank 184. A suitable shutoff valve 193 is interposed in the conduit 194 as shown. The lower housing section 182 is open at its lower end 183 whereby dust laden air in the tank 186 may be vented through the filter unit 180 by flowing into the interior of the housing section 182 and through the filter element 36. The housing section 183 could, of course, be modified to have an air inlet conduit 191 similar to the inlet conduit of the filter unit 10. Accordingly, by mounting the filter unit 180 to have a portion of its lower housing section 182 extending within a bulk material receiving tank, such as the tank 186, the overall height of the filter unit is reduced while yet access to the filter element 36 for service or replacement is easily accomplished. The filter unit 180 is also adapted for shipboard use by providing the discharge duct 100 with a butterfly type valve closure device 187 having a manual operator 189 whereby the duct 100 may be closed and sealed to prevent the ingestion of water into the filter unit and the storage tank 186 when the filter is not in use and the vessel is under way in heavy seas. The valve 187 is illustrated in FIGS. 1 and 4 also. The valve 187 is exemplary and other types of closures for the duct 100 may be adapted for use therewith.

Figures 8, 9:
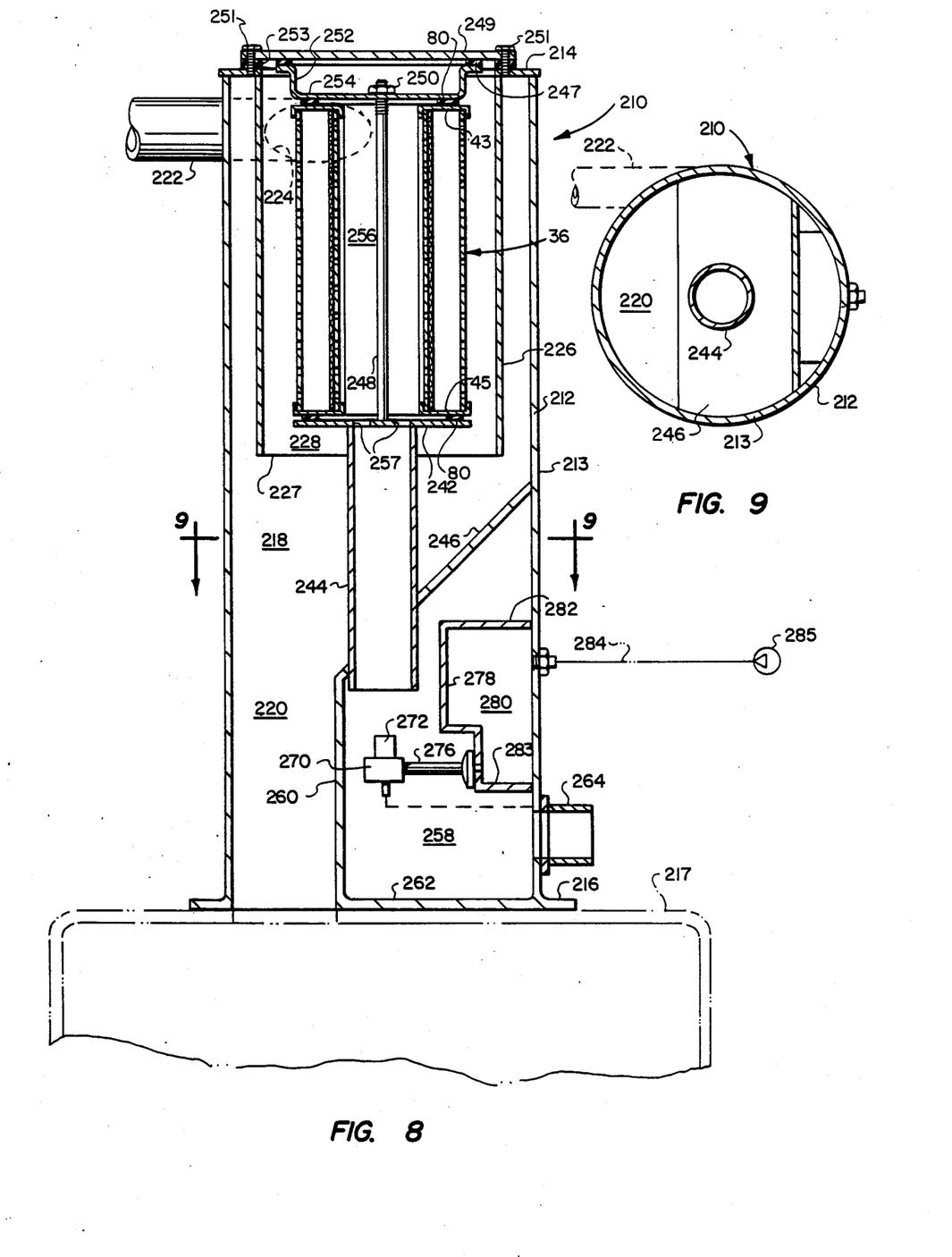
FIG. 8 is a longitudinal vertical section view of another embodiment of a filter unit in accordance with the present invention.
FIG. 9 is a section view taken along line 9—9 of FIG. 8.

Referring now to FIGS. 8 and 9, there is illustrated another embodiment of an air filter apparatus designated by the numeral 210. The filter apparatus 210 includes a generally cylindrical cabinet or housing 212 having a cylindrical sidewall 213, a transverse topwall 214 and a transverse bottom flange 216 for mounting the housing 212 on a material receiver tank 217. The housing 212 may be configured to be supported on or connected to other types of material receiving structures, not shown. The housing 212 defines an interior contaminated air chamber 218 which is in communication with an interior chamber 219 of the material receiving tank by way of a passage portion 220. The housing 212 is adapted to be in communication with a source of material laden air, not shown, by way of an inlet conduit 222 which opens into the interior chamber 218 at an opening 224 and generally tangentially with respect to the circumference of the housing 212. The opening 224 is also adjacent to a generally cylindrical shroud member 226 depending from the top wall 214. The shroud member 226 is open at its bottom edge 227 to define a secondary separation chamber 228 in which a filter element 36 is disposed. The filter element 36 is supported in the chamber 228 on a transverse cylindrical support plate 242 which is supported on and connected to a depending clean air flow conduit 244 extending downward from the plate 242. The conduit 244 is supported by and extends through a sloping wall 246 formed in the interior of the housing 212. A retaining rod 248 extends upward from the plate 242 and is threaded for receipt of a nut 250. A cylindrical pan shaped shield 252 having cylindrical bottom wall 254 extends across the upper end of the filter element 36 adjacent to the end wall 43 and forms a blind end for a clean air flow passage 256 formed in the interior of the filter element 36. The clean air flow passage 256 is in communication with the interior of the conduit 244 by way of suitable openings 257 in the plate 242 whereby clean air may flow downward through the conduit 244 into a clean air flow chamber 258 defned within the interior of the housing 212. The chamber 258 is formed by the wall 246, a vertical wall portion 260, a transverse bottom wall 262 and the sidewall 213. Clean air may exit the chamber 258 through an exit conduit 264. The particular arrangement of the filter apparatus 210 is adapted for a so-called positive pressure or greater than atmospheric pressure, forced flow of material laden air into the interior of the housing 212 by way of the conduit 222. Alternatively, the outlet passage from the chamber 258 provided by conduit 264 may be in communication with a suction fan or pump, not shown, for drawing air into and through the filter unit 210 in a negative pressure type system.

The filter element 36 is supported on the plate 242 and a resilient gasket member 80 is interposed between the endwall 45 and the support plate 242. A similar gasket member 80 is interposed between the end wall 43 and the shield 252. Access to the interior chamber 228 for servicing or inspection of the filter element 36 may be obtained by removal of a generally cylindrical cover member 249 which is secured to the transverse endwall 214 by suitable fasteners 251 and covers an opening 253 having a diameter corresponding to the inner diameter of the cylindrical shroud 226. Accordingly, the filter element 36 may be easily removed from the interior chamber 228 from the transverse top endwall 214 by removing the cover member 249, the nut 250 and the shield 252 and lifting the filter element upwardly off of the plate 242. A second gasket member 247 is interposed between the shield 252 and the cover 249. In this way personnel servicing or inspecting the filter element 36 are not required to enter the interior of the housing 212 below the filter element or through the dirtiest part of the chamber 218.

Referring further to FIG. 8 the filter unit 210 also includes a reverse air jet type filter element flushing system comprising a valve 270 interposed in the chamber 258 and positioned generally at the longitudinal center of the conduit 244. The valve 270 includes an exhaust nozzle 272 for directing a jet of pressure air upwardly through the conduit 244 and the passage 256 to impinge on the wall 254. The valve 270 is supported by a rigid conduit section 276 which is supported on a transverse stepped wall 278. The walls 278 and 213 and top and bottom walls 282 and 283 form a pressure air reservoir chamber 280 within the housing 212. Pressure air is admitted to the interior chamber 280 by way of a conduit 284 in communication with a source of pressure air 285. Suitable control means, not shown, may be utilized to operate the valve 270. Such control means may be of the type described and claimed in my U.S. Pat. No. 4,465,497 issued Aug. 14, 1984. Particulate material may be flushed off of the exterior surfaces of the filter element 36 by periodically generating reverse jets of pressure air and entrained air to flow upward through the conduit 244 into the chamber 256 and to diverge radially outwardly to dislodge material which then is allowed to fall downward through the chamber 228, the chamber 218 and passage 220 into the tank interior chamber 219.

At least a portion of the material separated by directional change of air flowing into the chamber 218 as well as by dislodgement from the filter element 36 impinges the sloping wall 246 and flows downward through the passage 220. In certain prior art filter apparatus there has been a tendency for material, particularly if it is damp, to accumulate on the sloping wall 246 and if ambient temperatures are below freezing to commence build up on the wall 246 and freeze into a solid mass which reduces the volume of the chamber 218 and, in a severe case impedes the separation process. However, with the arrangement of the clean air flow chamber 258 and the sloping wall 246 the wall 246 is maintained at a temperature close to the temperature of the air being processed and is warmed on both sides by this air to reduce the chance of significant accumulations of particulate material on the surface of the wall 246 which faces the chamber 218.

The present invention also enjoys an unexpected advantage with regard to the characteristics of the reverse flushing air action in removing accumulated particulate matter or "dust cake" from the exterior surface of the filter element 36.

Figure 10:
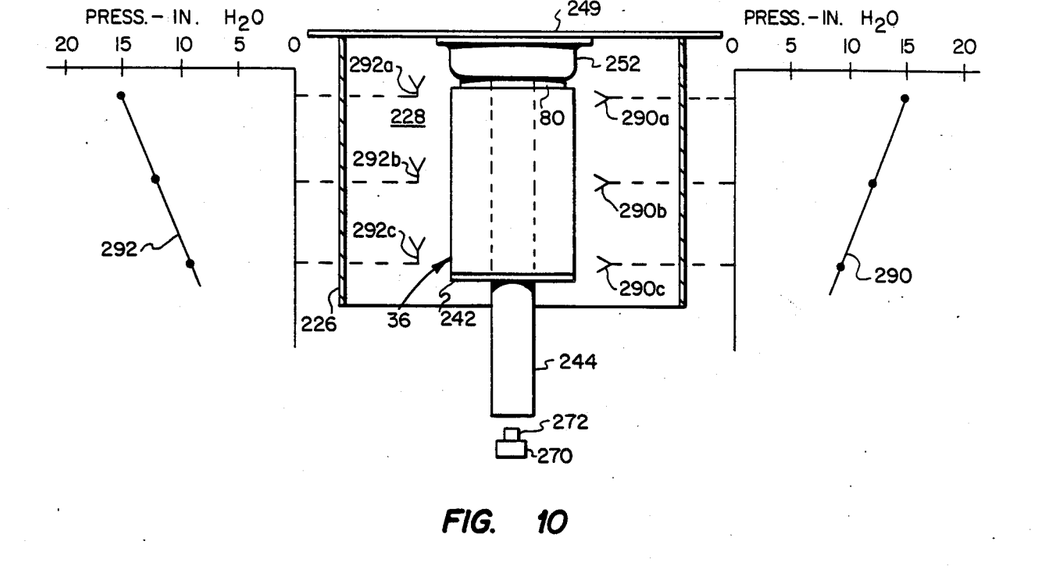
FIG. 10 is a schematic diagram illustrating reverse flushing air pressure and velocity gradients.

Referring to FIG. 10, there is illustrated a somewhat schematic diagram of the filter element 36, the shroud 226, the shield 252 and the conduit 244 in combination with curves indicating the static pressure in inches of water column measured at various points in the chamber 228 from a series of tests conducted by discharging a relatively high velocity jet of reverse flow flushing air from the valve 270 upward through the conduit 244 to allow it to flow out through the filter element 36 after impinging the shield 252. The static pressure taken from pitot tube readings and as indicated by the curve 290 is the greatest at a point 290a directly below the shield 252 and decreases progressively at points 290b and 290c toward the bottom of the filter element 36. The curve 290 indicates the relative radial outward directed velocity gradient along the filter element 36 between the shield 252 and the support plate 242.

Moreover, the diagram including the curve 292 indicates that pitot tube readings taken from points 292a, 292b and 292c in measuring the vertical downward velocity component of air flow during reverse flushing action also reveals the greatest flow velocity occuring at the measurement point 292a and decreasing progressively to the measurement point 292c. Accordingly, the highest radial outwardly directed flow velocity and vertically downward directed flow velocity occur at the upper regions of the filter element 36 which assures greater efficiency in removal of particulate material from the surface of the filter element and the prevention of reentrainment of material by the air flowing into the chamber 228 and through the filter element during normal filtering action.

Figure 11:
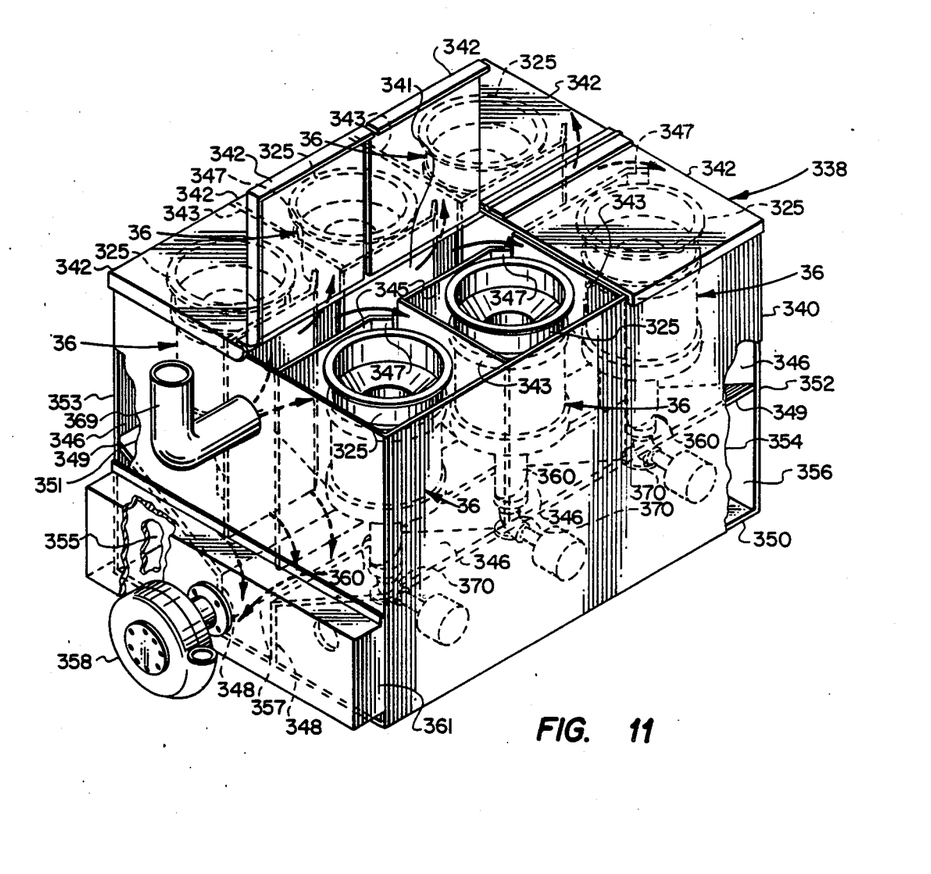
FIG. 11 is a perspective view of an embodiment of a multiple element top loading filter unit.

Referring now to FIG. 11, there is illustrated another embodiment of a filter apparatus, generally designated by the numeral 338, and characterized by a generally rectangular cabinet or housing 340 defining an interior contaminated air flow chamber 341. The housing 340 has a top wall defined by a plurality of hinged doors 342, six illustrated, which may be selectively opened to gain access to the chamber 341 for insertion of or removal of a plurality of respective filter elements 36. The filter elements 36 are supported in the housing 340 in substantially the same manner as they are supported in the housing 212 and are each provided with a pan-shaped shield 325 secured to the top side of the filter element and disposed between the filter element and the doors 342. Each filter element 36 may be suitably separated from an adjacent element by partitions 343 and 345. The partitions 345 each include louvers 347 which define an opening from the chamber 341 into respective chambers 346 in which each filter element is disposed. The partitions 345 and louvers 347 provide for directing air flow into each of the separate filter element chambers 346 more uniformly and prevent material dislodged from one element being deposited on an adjacent element. Two of the doors 342 are shown in an opened position to illustrate the interior arrangement of the filter elements. The doors 342 may be latched in their closed position by suitable means, not shown.

The housing 340 is provided with opposed interior sloping walls 349 which extend from respective outer housing sidewalls 353 and 354 towards a center trough section 357 defined by spaced apart vertical channel wall portions 348 and a bottom wall 350.

Respective clean air chambers 355 and 356 are formed between the sloping walls 349, and the housing endwalls, sidewalls, bottom wall and the respective channel walls 348. The chambers 355 and 356 are each in communication with a clean air plenum 361 disposed on the endwall 351 and in communication with a suction air pump 358 for drawing clean air out of the respective chambers and through the plenum. Dust laden air is admitted to the chamber 341 by an inlet conduit 369 entering the chamber through the endwall 351.

Each of the filter elements 36 is in communication with a clean air discharge flow tube 360 which extends downward through respective ones of the sloping walls 349 and opens into the respective clean air flow chambers 355 and 356. Only three of the flow tubes 360 are shown in FIG. 11, however, those skilled in the art will appreciate that each of the filter elements 36 is arranged in a manner similar to the arrangement of FIG. 8 wherein clean air is discharged through the interior flow chamber of the filter element and through its associated flow tube 360 into the respective clean air chambers or plenums 355 and 356. Each of the flow tubes 360 terminates just above a reverse jet backflushing valve 370 suitably supported within the chambers 355 and 356, respectively, and in communication with a source of pressure air, not shown. Accordingly, each of the filter elements 36 in the filter unit 338 may be accessed for replacement or inspection by opening the associated door 342, removing the filter element shield 325 and grasping the element 36 from its interior clean air flow chamber area to remove the filter element for inspection or to replace the element. The shields 325 are, of course, in sealing engagement with the doors 342 by suitable gaskets such as the gasket 247 shown in FIG. 8. Moreover, the arrangement of the valves 370 and the material slide plates 349 provides for maintaining this structure at a temperature corresponding to the air flowing through and being processed by the apparatus 338. Each of the valves 370 may be connected to a source of pressure air, not shown, and to a sequencing type control circuit for opening the respective valves in a predetermined order such as described in U.S. Pat. No. 4,465,497.

Although preferred embodiments of the invention have been described in detail herein, those skilled in the art will recognize that various substitutions and modifications may be made to the specific embodiments shown and described without departing from the scope and spirit of the invention as recited in the appended claims.

What I claim is:

1. Apparatus for separating particulate material from an air flow stream comprising:
 a housing including a first housing section forming a material separation chamber and second housing section forming a clean air chamber;
 an inlet conduit in communication with said housing for conducting air laden with particulate material into said separation chamber;
 a transverse wall of said first housing section, defining part of said separation chamber;
 means forming a bore opening through said transverse wall of said first housing section into said housing and of sufficient diameter to permit insertion and removal of a barrier type filter element with respect to said separation chamber;
 a barrier type filter element;
 a transverse wall of said second housing section defining part of said clean air chamber and forming an opening for conducting filtered air from said filter element to said clean air chamber, said transverse wall of said second housing section including means for sealingly supporting said filter element in said separation chamber in such a way that said filter element is insertable in and removable from said bore and with respect to said transverse wall of said first housing section without requiring entry into said separation chamber;

means for sealing between said first and second housing sections; and means for releasably securing said second housing section to said first housing section whereby said second housing section may be moved clear of said bore in said transverse wall of said first housing section sufficiently to permit removal of said filter element from said first housing section.

2. The apparatus set forth in claim 1 wherein:

said inlet conduit is in communication with said separation chamber in such a way as to induce substantially cyclonic flow of air entering said separation chamber, and said housing includes a shroud disposed around said filter element and between said filter element and a wall defining said first section of said housing.

3. The apparatus set forth in claim 1 wherein:

said means for supporting said filter element comprises a plate member engaged with one end of said filter element, a first elongated support member secured to said plate member and extending into a clean air flow chamber formed by said filter element, and said second housing section includes a clean air flow tube extending from said transverse wall of said second housing section and in communication with said clean air flow chamber.

4. The apparatus set forth in claim 1 including:

pressure relief means for venting said separation chamber directly to atmosphere, said pressure relief means including biasing means for yieldably biasing said second housing section toward said transverse wall of said first housing section to form a seal between said transverse wall of said first housing section and said transverse wall of said second housing section, said biasing means being responsive to a predetermined pressure in said separation chamber for moving said second housing section a limited distance relative to said first housing section to break said seal.

5. The apparatus set forth in claim 4 wherein:

said biasing means includes a plurality of retaining members secured to one of said first and second housing sections and supporting spring means between said first and second housing sections, said spring means being yieldable to permit said movement of said second housing section.

6. The apparatus set forth in claim 5 including:

a removable cover disposed on said second housing section closing an access port for access to said retaining members.

7. The apparatus set forth in claim 4 wherein:

said means for releasably securing said second housing section to said first housing section includes a plurality of connecting pins mounted spaced apart on the exterior of one of said housing sections and supporting latch means engageable with cooperating latch means on the other of said housing sections, said biasing means comprising spring means for biasing said latch means in engagement and permitting limited movement of one housing section relative to the other housing section at said predetermined pressure.

8. The apparatus set forth in claim 1 wherein:

said second housing section is interconnected with said first housing section by hinge means, said hinge means including a hinge pin interconnecting said housing sections and actuating means for moving said second housing section relative to said first housing section whereby said filter element may be removed from said first housing section through said bore in said transverse wall of said first housing section.

9. The apparatus set forth in claim 8 wherein:

said hinge pin is journalled by bearing means on one of said first housing section and said second housing section for pivotal movement relative to said first housing section, and said actuating means includes an actuating lever connected to said hinge pin and to linkage means secured to said first housing section for moving said second housing section away from said first housing section axially with respect to a longitudinal axis of said hinge pin whereby said second housing section may be rotated about said axis of said hinge pin to move clear of said opening in said transverse wall.

10. The apparatus set forth in claim 1 including:

reverse air jet filter element backflushing means disposed in said second housing section including at least one air jet means.

11. The filter unit as set forth in claim 1 including:

a suction fan in air flow receiving communication with said clean air chamber.

12. Air filter apparatus for filtering air laden with particulate material, comprising:

a housing having sidewall means and a top side including means forming a transverse top wall defining an enclosed separation chamber;

means forming an opening in said housing for conducting air with entrained particulate material into said separation chamber, and means for discharging material separated in said separation chamber from said housing;

a porous media barrier impingement type filter element supported on support means in said separation chamber between a bottom seal means at one end of said filter element and a top seal means at the other end of said filter element, said support means including a plate disposed in said housing and supporting said bottom seal means;

a clean air discharge flow tube extending downward from said plate in communication with an interior clean air chamber formed by said filter element for conducting clean air from said housing; and a removable cover part connected to said housing and movable to open said housing from said top side for removing said filter element.

13. Apparatus for filtering air laden with particulate material, comprising:

a housing having side wall means and means forming a transverse top wall defining an enclosed material separation chamber;

means for conducting air with entrained particulate material into said separation chamber, and material discharge means for discharging material separated in said separation chamber from said housing;

a filter element supported at one end adjacent said tranverse top wall in said material separation chamber;

a clean air flow tube in said separation chamber and connected to the other end of said filter element in communication with an interior clean air chamber formed by said filter element for conducting clean air from said filter element through said material separation chamber to a clean air plenum chamber formed in said housing by a common wall between said plenum chamber and said separation chamber and below said filter element;

a cover part connected to said housing and movable to open said housing from said top wall for removing said filter element; and means disposed in said plenum chamber for discharging a stream of pressure air into said flow tube in a direction opposite to normal clean air flow to remove accumulations of particulate material from said filter element.

14. Apparatus for separating particulate material from an air flow stream comprising:

a housing;

a transverse wall of said housing defining a separation chamber;

an inlet conduit in communication with said housing for conducting air laden with particulate material into said separation chamber;

means forming a bore opening through said transverse wall into said housing and of sufficient diameter to permit insertion and removal of a barrier type filter element with respect to said separation chamber;

a barrier type filter element having opposite ends with an interior clean air chamber therebetween;

a filter support member for supporting one end of said filter element with respect to said transverse wall with said filter element in said separation chamber in such a way that said filter element is insertable in and removable from said bore and with respect to said transverse wall without requiring entry into said separation chamber;

a clean air flow tube connected to the other end of said filter element in communication with said interior clean air chamber of said filter element for conducting clean air from said filter element to a clean air outlet of said housing;

a cover part connected to said housing and movable to open said housing from a top side thereof for removing said filter element from said bore; and means for discharging a stream of pressure air in said flow tube in a direction opposite to normal clean air flow to remove accumulations of particulate material from said filter element.

15. The apparatus set forth in claim 14 wherein:

said housing includes sloping wall means for receiving material separated from said air stream, said wall means being disposed to divide said housing into said separation chamber and a clean air plenum chamber for receiving air from said flow tube, and said flow tube extends through said wall means into communication with said clean air plenum chamber in said housing.

16. The apparatus set forth in claim 15 including:

top seal means engageable with said filter element for sealing said clean air chamber in said filter element at one end of said filter element from direct flow communication with said separation chamber, said top seal means including a shield member disposed at said one end of said filter element.

17. The apparatus set forth in claim 14 including:

a plurality of filter elements disposed in said separation chamber, each of said filter elements being in communication with a clean air flow tube in said housing for conducting clean air flow away from said filter elements, respectively.

18. The apparatus set forth in claim 17 including:

partition means in said separation chamber for separating said filter elements from line of sight flow communication with each other, said partition means including spaced apart inlet air louvers forming openings for admitting air to be filtered to each of said plural filter elements, respectively.

19. The apparatus set forth in claim 14 wherein:

said means for discharging a stream of pressure air is disposed to provide for impinging said stream of pressure air against a wall formed across a top end of said filter element in such a way that a radially outward directed flow of air is provided to remove accumulations of particulate material on said filter element, the velocity of said radially outward directed flow being progressively greater toward the top end of said filter element.

20. Apparatus for separating particulate material from an air flow stream comprising:

a housing forming a material separation chamber, said housing including a first section including said separation chamber, and a second housing section secured to said first section;

an inlet conduit in communication with said housing for conducting air laden with particulate material into said separation chamber;

a transverse wall of said housing, defining part of said separation chamber;

means forming a bore opening through said transverse wall into said housing and of sufficient diameter to permit insertion and removal of a barrier type filter element with respect to said separation chamber;

a barrier type filter element;

means for supporting said filter element in said separation chamber in such a way that said filter element is insertable in and removable from said bore and with respect to said transverse wall without requiring entry into said separation chamber, said means for supporting said filter element including a plate member engaged with one end of said filter element, a first elongated support member secured to said plate member and extending into a clean air flow chamber formed by said filter element, and said second housing section includes a clean air flow tube extending from an endwall of said second housing section and in communication with said clean air flow chamber;

means for releasably securing said second housing section to said first housing section whereby said second housing section may be moved clear of said bore in said transverse wall sufficiently to permit removal of said filter element from said first housing section; and, pressure relief means for venting said separation chamber directly to atmosphere, said pressure relief means including biasing means for yieldably biasing said second housing section toward said transverse wall of said first housing section to form a seal between said transverse wall of said first housing section and cooperating wall means of said second housing section, said biasing means being responsive to a predetermined pressure in said separation chamber for moving said second housing section a limited distance relative to said first housing section to break said seal.

21. Apparatus for separating particulate material from an air flow stream comprising:

a housing including a first housing section forming a material separation chamber and a coaxial second housing section forming a clean air chamber;

an inlet conduit in communication with said housing for conducting air laden with particulate material into said separation chamber;

a transverse wall in said first housing chamber between said first and second housing sections;

means forming a bore opening through said transverse wall of said first housing section into said first housing and of sufficient diameter to permit insertion and removal of a barrier type filter element with respect to said separation chamber;

a barrier type filter element;

a transverse wall in said second housing section defining part of said clean air chamber and sealingly supporting said filter element in said separation chamber in such a way that said filter element is insertable in and removable from said bore of said transverse wall of said first housing section and with respect to said transverse wall of said first housing section without requiring entry into said separation chamber;

hinge means for interconnecting said first and second housing sections, said hinge means including a hinge pin substantially parallel to the axes of said first and second housing sections.

22. The apparatus as claimed in claim 21, including means for moving said second housing section axially with respect to said hinge pin.

23. Apparatus for separating particulate material from an air flow stream comprising:

a housing including a first housing section forming a material separation chamber and a second housing section forming a clean air chamber;

an inlet conduit in communication with said housing for conducting air laden with particulate material into said separation chamber;

a transverse wall of said first housing section defining part of said separation chamber;

means forming a bore opening through said transverse wall of said first housing section into said housing and of sufficient diameter to permit insertion and removal of a barrier type filter element with respect to said separation chamber;

a barrier type filter element;

said second housing section including a transverse wall defining part of said clean air chamber and supporting said filter element in said separation chamber in such a way that said filter element is insertable in and removable from said bore and with respect to said transverse wall of said first housing chamber without requiring entry into said separation chamber;

means for forming a seal between said filter element and said transverse wall of said second housing section;

and means for yieldably biasing said transverse wall of said second housing into sealing engagement with said transverse wall of said first housing section, said biasing means being pressure responsive to move said support means out of sealing engagement with said transverse wall.

24. An air filter unit for separting particulate material entrained in an air flowstream comprising:

a filter housing including a first housing section forming a separation chamber, said first housing section including means forming a generally horizontal transverse wall at one end having an opening therein;

means forming an opening in said first housing section for conducting a particulate material laden air flowstream into said separation chamber;

means for discharging material separated from said air flowstream from said first housing section;

a porous media filter element adapted to be disposed in said separation chamber and having a portion defining a barrier between a clean air flow chamber and said separation chamber;

a second housing section secured to said first housing section for receiving filtered air from said clean air flow chamber and means for venting clean air from said second housing chamber, said second housing section including means for supporting said filter element in said first housing section;

seal means engageable with said filter element and forming a fluid-tight seal between said second housing section and said clean air flow chamber;

means for releasably securing said second housing section to said first housing section; and means interconnecting said housing sections including hinge means for moving said second housing section axially relative to said first housing section along an axis of said hinge means and pivotally about said axis of said hinge means, said axis of said hinge means being substantially parallel to the axis of said first and second housing sections whereby said second housing section may be moved clear of said opening in said transverse wall sufficiently to permit removal of said filter element from said first housing section through said opening in said top wall.

25. A top loading air filter unit in combination with a bulk material storage tank, said filter unit including a first housing section extending through a top wall portion of said storage tank and having a bottom opening from an interior chamber defined by said first housing section to the interior of said storage tank, means forming a transverse top endwall of said first housing section and including an opening for insertion and removal of a porous media air filter element with respect to said interior chamber, a second housing section including means for supporting said filter element in said interior chamber and defining a clean air chamber and a clean air discharge conduit in communication with said clean air chamber for discharging filtered air from said interior of said storage tank through said second housing section, means for supporting said second housing section on said first housing section including hinge means having a hinge axis substantially parallel to the axes of said first and second housing sections and means for moving said second housing section axially along said hinge axis and pivotally about said hinge axis whereby said second housing section may be moved clear of said opening in said top endwall to permit insertion and removal of said filter element with respect to said interior chamber from said top endwall, and means for sealing between said first and second housing sections.

26. An air filter unit for filtering air laden with particulate material, comprising:

a housing having sidewall means and a top side including means forming a generally horizontal transverse top wall defining an enclosed contaminant chamber;

means forming an opening in said housing for conducting air with entrained particulate material into said contaminant chamber, and means for discharging material separated in said contaminant chamber from said housing;

a generally annular porous media barrier type filter element defining an interior clean air chamber supported on means in said contaminant chamber between a bottom seal means at one end of said filter element and a top seal means at the other end of said filter element and in such a way that the central longitudinal axis of said filter element extends substantially vertically in the normal working position of said filter unit;

a clean air discharge flow tube in communication with said clean air chamber formed by said filter element and including a portion extending vertically downward from said filter element for conducting clean air from said clean air chamber toward the exterior of said housing; and a removable cover part connected to said housing and movable to open said housing from said top side for removing said filter element.

27. An air filter unit for separating particulate material entrained in an air flowstream comprising:

a filter housing including a first housing section forming an interior contaminant chamber, said first housing section including means forming a generally horizontal transverse top wall at one end having an opening therein;

means forming an opening in said first housing section for conducting a particulate material laden air flowstream into said chamber in said first housing section;

a porous media filter element adapted to be disposed in said contaminant chamber and having a portion defining a barrier between a clean air flow chamber and said contaminant chamber;

means for supporting said filter element in said first housing section;

a second housing section mounted above said first housing section and disposed across said top wall;

means for releasably securing said second housing section to said first housing section;

hinge means having an axis substantially parallel to the axes of said housing sections interconnecting said housing sections and supported by bearing means on one of said housing sections for pivotal movement of said second housing section relative to said first housing section; and actuating means for moving said second housing section relative to said first housing section whereby said filter element may be removed from said first housing section through said opening in said top wall, said actuating means including an actuating lever connected to said hinge means and to linkage means secured to one of said housing sections for lifting said second housing section vertically away from said first housing section and axially with respect to said axis of said hinge means whereby said second housing section may be rotated about said axis of said hinge means to move clear of said opening in said top wall sufficiently to permit removal of said filter element from said first housing section.

28. An air filter unit for filtering air laden with particulate material, comprising:

a housing having sidewall means, a top side including means forming a generally horizontal transverse top wall defining an enclosed contaminant chamber and interior partition means dividing said contaminant chamber into a plurality of contaminant subchambers;

means forming an opening in said housing for conducting air with entrained particulate material into said contaminant subchambers, and means for discharging material separated in said contaminant subchambers from said housing;

a plurality of generally annular porous media barrier type filter elements disposed in respective ones of said contaminant subchambers and each defining an interior clean air chamber, said filter elements each being supported on means in said contaminant subchambers, respectively, below a top seal means at one end of said filter elements and in such a way that the central longitudinal axis of said filter elements each extend substantially vertically in the normal working position of said filter unit;

a clean air discharge flow tube in communication with each of said clean air chambers formed by said filter elements and including a portion extending vertically downward frm said filter elements in respective ones of said contaminant subchambers and through a sloping wall in said housing defining in part respective ones of said contaminant subchambers, said flow tubes being operable for conducting clean air from said clean air chambers toward the exterior of said housing; and means forming a removable cover part connected to said housing and movable to open said housing from said top side for removing respective ones of said filter elements.

29. Apparatus for separating particulate material from an air flow stream, which comprises:

a housing including a first housing section forming a material separation chamber and a second housing section forming a clean air chamber;

a transverse wall in said second housing section between said first housing section and said second housing section and defining in part said clean air chamber;

a barrier type filter element sealingly supported by said transverse wall of said second housing section in said separation chamber;

means for sealing between said first housing section and said second housing section; and means for separably interconnecting said first and second housing sections.

30. The apparatus set forth in claim 29, wherein:

said first housing section includes a transverse wall having a bore therethrough for receiving said barrier type filter element; and said means for sealing between said first and second housing section includes a seal disposed between said transverse walls of said first and second housing section.

31. The apparatus set forth in claim 29, including:

pressure relief means for venting said separation chamber to atmosphere, said pressure relief means including means for yieldably biasing said second housing section into sealing engagement with said first housing section, said biasing means being responsive to a predetermined pressure in said separation chamber to move said second housing section out of sealing engagement with said first housing section.

32. The apparatus set forth in claim 31, wherein:

said biasing means includes a plurality of retaining members secured to one of said first and second housing sections and supporting spring means for yielding to permit said movement of said second housing out of sealing engagement with said first housing section.

* * * * *